United States Patent Office 3,109,799
Patented Nov. 5, 1963

3,109,799
PROCESS FOR THE PRODUCTION OF p-MONO-CHLOROMETHYL BENZOIC ACID
Ewald Katzschmann, Dortmund-Kruckel, Germany, assignor to Chemische Werke Witten, Gesellschaft mit beschraenkter Haftung, Witten (Ruhr), Germany
No Drawing. Filed Oct. 17, 1960, Ser. No. 62,899
Claims priority, application Germany Oct. 28, 1959
10 Claims. (Cl. 204—158)

The present invention relates to the production of the mono-chloromethyl benzoic acids and, more particularly, to the production of p-mono-chloromethyl benzoic acid.

The mono-chloromethyl benzoic acids are valuable starting materials for conducting numerous synthesis. Of particular importance is p-mono-chloromethyl benzoic acid whose saponification product, namely p-hydroxymethyl benzoic acid, has been proposed as a poly-condensation component. Heretofore, however, p-mono-chloromethyl benzoic acid has not been available in sufficient quantities for extended use because of the difficulties in the production thereof.

In the known methods of producing p-mono-chloromethyl benzoic acid, many technical difficulties are present which limit the production and which do not allow production on a large scale. It has, for example, been suggested to chlorinate p-toluic acid in the fusion of p-toluic acid chloride.

It has also been proposed to chlorinate p-toluic acid dissolved in 1,1,2,2-tetrachloro-ethane at 140° C. under exposure to light. A yield of only 34% of the theoretical amount is obtained thereby, however.

The difficulties in the known processes consist in that, during operation in the fusion, a strong sublimation takes place and the temperature must be maintained above the melting point of p-mono-chloromethyl benzoic acid, which is almost 200° C. At such high temperatures, it is hardly possible to conduct the reaction in such a manner that only mono-chloro-compounds are formed.

In the case of the process conducted with a solvent, the solvent must have a good solubility for p-toluic acid, yet it must itself be difficult to chlorinate or not be chlorinatable at all. Finally, there must be assurance that the mono-chloro-compound formed will not be further chlorinated in the selected solvent. Such limitations obviously present impractical restrictions for the solvents usable in the proposed process.

It has now been found, however, that toluic acid can be converted to mono-chloromethyl benzoic acid in a particularly simple manner in that the same is chlorinated in approximately double to quintuple quantity, preferably the triple to quadruple amount, of a suitable suspension agent under exposure to light at temperatures of between 25 and 115° C., preferably between 85 and 95° C.

It is an object of the present invention, therefore, to produce mono-chloromethyl benzoic acids in a simple and effective manner and with an excellent yield.

Other objects of the present invention and advantageous features thereof will become apparent as the description proceeds.

Suitable suspension agents for use in the process according to the present invention include such agents which are available in liquid form at the chlorination temperature, or such agents which have a melting point below 80° C. Suitable suspension agents include, for example, benzoic acid methyl ester, toluic acid methyl ester, monochlorobenzene, the incompletely chlorinated products of toluic acid methyl ester and benzoic acid methyl ester, dichlorobenzene, benzyl chloride, etc. The above-named suspension agents may be utilized alone, or, if necessary, in mixture with each other.

Apart from the above-mentioned suspension agents, numerous other compounds may be used, whereby it is quite possible to selectively choose suitable means, for example, such means as can be procured easily.

The above-mentioned suspension agents do not have the property of dissolving p-toluic acid completely at the chlorination temperature.

In principle, the process according to the present invention comprises suspending p-toluic acid in a suitable suspension agent. Precipitated or finely pulverized p-toluic acid is suspended in, for example, the triple or quadruple amount of benzoic acid methyl ester. An investigation shows that even at 120° C., no solution takes place. Chlorine is then introduced into the suspension at a temperature of 75° C. under exposure to light. The light source may be, for example, a UV-lamp, a normal light bulb, or sun- or daylight. It is advisable to introduce the chlorine slowly. A velocity of 1.5–3 liters/min./kg. reaction material has been found to be particularly favorable.

The temperature of the reaction mixture rises slightly within a few minutes and is subsequently adjusted in such a manner as to be maintained between approximately 80 and 110° C. A temperature range of from 85–95° C. has been found to be particularly advantageous. By using cylindrical chlorination vessels, the consumption of chlorine may be kept in almost theoretical amounts.

According to the quantity of the batch used, after a shorter or longer period of time and at a temperature of 75° C., a temporary apparent solution takes place. This occurrence cannot be explained, since at this temperature and without the introduction of chlorine, a complete solution will never occur. This apparent state of solution, however, lasts only for a short period of time, and thereupon, turbidity will re-occur and soon thereafter crystallization to a maximum. The completion of the chlorine absorption is distinctly noticeable by an up-coming yellow coloration.

Upon termination of the chlorine absorption, nitrogen is passed through the reaction product for the purpose of removing excess chlorine and any hydrogen chloride formed. Thereupon, the p-mono-chloromethyl benzoic acid is at once filtered off, sucked off, or centrifuged off, either while still hot or upon cooling. Any possible adhering suspension agents may be distilled off under vacuum or removed with suitable washing agents, for example, petroleum ether. If high requirements of purity are to be met by the reaction product, it is preferable to perform a recrystallization according to methods known per se.

The crude p-mono-chloromethyl benzoic acid may be saponified at once to p-hydroxymethyl benzoic acid in a known manner. Both the crude p-mono-chloromethyl benzoic acid and the pure p-mono-chloromethyl benzoic acid are valuable raw materials for the production of softeners and synthetic substances.

The following examples serve to illustrate the present invention without, however, limiting the same thereto.

*Example 1*

25.5 g. precipitated p-toluic acdi are suspended in 102 g. benzoic acid methyl ester and placed in a cylindrical vessel. 0.2 liter/min. chlorine are added under exposure to the light of a 200 watt light bulb which simultaneously serves for heating. The suspension changes in color from white to yellow. After 4 minutes, the temperature has reached 84° C., and the yellow coloration has completely disappeared, the suspension again being purely white. After 10 minutes, the reaction product is water-clear at 86° C. After a total of 15 minutes, and still at 86° C., the reaction product starts to become turbid. After 18 minutes and upon a slight increase in temperature to 87° C., strong crystallization sets in. After a total of 60 minutes, the temperature has risen to 90° C. The termination of chlorination is obvious from a faint beginning yellow coloration. Thereafter, nitrogen is blown through for 10 minutes. The yield amounts to 135 g.

The crystalline deposit is sucked off, washed with petroleum ether and dried. 27 g., 84.5% of the theoretical yield, of p-mono-chloromethyl benzoic acid are obtained. The product has the following characterizing numbers:

|  | Experimental | Calculated |
|---|---|---|
| Acid number | 326 | 329. |
| Saponification number | 660 | 658. |
| Cl | 21% | 20.8%. |
| Melting point | 196° C | n. Lit. 196–199° C. |

Example II 34 g. pulverized p-toluic acid are suspended in 112.6 g. mono-chlorobenzene and chlorinated by passing therethrough 0.2 liter/min. chlorine while being exposed to the light of an UV-laboratory dipping lamp. The introduction of chlorine commences at 26° C. The suspension discolors to yellow. After 7 minutes, the temperature has risen to 47° C. and, upon a violent HCl separation, decoloration takes place. After 10 minutes, the temperature is at 70° C. The heat is brought to 100° C., whereby the reaction product becomes temporarily clear. Upon another increase in temperature to 110° C., a strong crystallization sets in. After 45 minutes, nitrogen is blown through for the purpose of removing chlorine and hydrochloric acid. The yield is 157 g.

After cooling, the crystal mass is diluted with petroleum ether and filtered. The crystalline filter residue is washed and dried. The yield of p-mono-chloromethyl benzoic acid is 35.5 g., 82.7% of the theoretical amount, with a chlorine content of 20.6%.

Example III 25.5 g. precipitated p-toluic acid are suspended in 100 g. partially chlorinated benzoic acid methyl ester and, respectively, filtrate from a chlorination as described in Example I, having a chlorine content of 5.4%. The suspension is chlorinated by passing therethrough 0.3 liter/min. chlorine while being exposed to the light of two 200 watt light bulbs. The distance of the light bulbs from the chlorination vessel is so chosen that the temperature will not rise above 98° C. After 15 minutes, an apparent solution takes place at 86° C., which is soon followed by a turbidity and crystallization. After a total of 60 minutes, nitrogen is blown through the reaction product.

After cooling, suction is effected and the crystalline deposit is washed and dried. 28 g., 87.5% of the theoretical yield, of p-mono-chloromethyl benzoic acid are obtained, having the following characterizing numbers:

| Acid number | 330 |
|---|---|
| Saponification number | 656 |
| Cl ............................percent | 20.5 |
| Melting point ........................° C | 196.5 |

Example IV 200 g. p-toluic acid (finely pulverized) are suspended in 350 g. p-toluic acid methyl ester and chlorinated by passing therethrough 0.3 liter/min. of chlorine while being exposed to the light of two 200 watt light bulbs. The chlorination is conducted for over 2 hours at a temperature of between 100 and 115° C. Subsequently, a nitrogen stream of 1 liter/min. is passed through the reaction product for 15 minutes for the purpose of removing the chlorine and hydrogen chloride. The total yield is 648 g. After cooling in ice water, the solid constituents are sucked off, washed with xylene and dried xylene-free.

224 g. p-chloromethylbenzoic acid, corresponding to 89% of the theoretical amount, are obtained in a good degree of purity and having the following characterizing numbers:

|  | Experimental | Calculated |
|---|---|---|
| Saponification number | 660 | 658 |
| Chlorine content..........percent | 20.2 | 20.8 |

After recrystallization from aqueous alcohol, the product is obtained in its purest form.

Example V 35 g. pulverized p-toluic acid are suspended in 100 g. partially chlorinated p-toluic acid methyl ester. The chlorination is conducted, during exposure to light, with 0.2 liter/min. chlorine and at a temperature of between 85 and 95° C. After 50 minutes, nitrogen is sent through the reaction product, the latter is subsequently cooled, and the crystalline constituents are sucked off. The crude product is washed with benzene and petroleum ether and then dried.

39.5 g. p-chloromethylbenzoic acid, corresponding to 90% of the theory, are obtained with the following characterizing numbers:

|  | Experimental | Calculated |
|---|---|---|
| Saponification number | 659 | 658 |
| Chlorine content..........percent | 20.4 | 20.8 |

In the place of the suspension agents used in the above examples, other suspension agents may be used. Other suspension agents usable in the process according to the present invention include dichlorobenzene, benzyl chloride, etc.

Of course, many changes and variations in the reaction conditions, temperatures, duration, kind and source of light rays, the manner of working-up the reaction mixture, and of isolating and purifying the resulting products and the like, may be made by those skilled in the art in accordance with the principles set forth hereinabove, and I, therefore, do not wish to be limited to the details and specific examples described herein only for illustrative purposes, but intend to cover all such changes and modifications as are encompassed by the scope of the appended claims.

I claim:

1. A process for the production of mono-chloromethyl benzoic acid by the chlorination of toluic acid under exposure to light, comprising forming a suspension of toluic acid and converting said toluic acid in suspension to mono-chloromethyl benzoic acid by passing chlorine through said toluic acid suspension while exposing said suspension to light rays and separating the resulting mono-chloromethyl benzoic acid.

2. A process as defined in claim 1, wherein the suspension agent for the toluic acid suspension is a liquid at the reaction temperature.

3. A process as defined in claim 2, wherein the chlorination is carried out at a temperature between approximately 25° and 115° C.

4. A process as defined in claim 1, wherein the suspension agent for the toluic acid suspension is selected from the group consisting of the methyl esters of aromatic carboxylic acids, the chlorobenzenes, the chlorinated methyl esters of aromatic carboxylic acids, and mixtures thereof.

5. A process as defined in claim 1, wherein the chlorination is carried out at a temperature between approximately 25 and 115° C., and wherein the suspension agent for the toluic acid suspension is an aromatic organic compound which is a liquid at the chlorination temperature.

6. A process as defined in claim 5, wherein the suspension agent is a methyl ester of an aromatic carboxylic acid.

7. A process as defined in claim 5, wherein the suspension agent is a chlorobenzene.

8. A process as defined in claim 5, wherein the suspension agent is a chlorinated aromatic carboxylic acid methyl ester.

9. A process for the production of p-mono-chloromethyl benzoic acid by the chlorination of p-toluic acid under exposure to light, comprising forming a suspension of p-toluic acid in a suspension agent selected from the group consisting of the methyl esters of aromatic carboxylic acids, the chlorobenzenes, the chlorinated aromatic carboxylic acid methyl esters, and mixtures thereof and converting said p-toluic acid in suspension to p-monochloromethyl benzoic acid by passing chlorine through said p-toluic acid suspension while exposing said suspension to light and while maintaining the temperature of said suspension between approximately 25 and 115° C.

10. A process for the production of p-mono-chloromethyl benzoic acid by the chlorination of p-toluic acid under exposure to light, comprising forming a suspension of p-toluic acid in approximately double to quintuple the amount of a suspension agent selected from the group consisting of the methyl esters of aromatic carboxylic acids, the chlorobenzenes, the chlorinated aromatic carboxylic acid methyl esters, and mixtures thereof and converting said p-toluic acid in suspension to p-mono-chloromethyl benzoic acid by passing chlorine through said p-toluic acid suspension while exposing said suspension to light and while maintaining the temperature of said suspension between approximately 85 and 95° C.

References Cited in the file of this patent

UNITED STATES PATENTS

| | | |
|---|---|---|
| 2,563,820 | Darragh et al. | Aug. 14, 1951 |
| 2,763,610 | Feichtinger et al. | Sept. 18, 1956 |
| 2,968,673 | Pursglove | Jan. 17, 1961 |